Feb. 20, 1940.    A. Y. DODGE    2,190,830
HYDRAULIC TORQUE CONVERTER
Filed Jan. 4, 1936    8 Sheets-Sheet 1

INVENTOR.
ADIEL Y. DODGE
BY McConkey & Booth
ATTORNEYS.

Fig. 3

Feb. 20, 1940.    A. Y. DODGE    2,190,830
HYDRAULIC TORQUE CONVERTER
Filed Jan. 4, 1936    8 Sheets-Sheet 3

INVENTOR.
ADIEL Y. DODGE
BY McConkey & Booth
ATTORNEYS.

Feb. 20, 1940.   A. Y. DODGE   2,190,830
HYDRAULIC TORQUE CONVERTER
Filed Jan. 4, 1936   8 Sheets-Sheet 4

INVENTOR.
ADIEL Y. DODGE
BY McConkey & Booth
ATTORNEYS.

Feb. 20, 1940.  A. Y. DODGE  2,190,830
HYDRAULIC TORQUE CONVERTER
Filed Jan. 4, 1936  8 Sheets-Sheet 5

INVENTOR.
ADIEL Y. DODGE
BY McConkey & Booth
ATTORNEY.

Fig. 18.

Patented Feb. 20, 1940

2,190,830

UNITED STATES PATENT OFFICE 2,190,830

HYDRAULIC TORQUE CONVERTER

Adiel Y. Dodge, South Bend, Ind.

Application January 4, 1936, Serial No. 57,520

18 Claims. (Cl. 60—54)

This invention relates to hydraulic torque converters and more particularly to torque converters in which the liquid flow is toroidal.

The torque converter of the present invention is particularly adapted for use in a power transmission of the type illustrated in my copending applications Serial Nos. 723,083 and 34,303 and is designed to produce high operating efficiencies throughout a wide range of torque and speed ratios. This application is a continuation in part of application Serial No. 34,303, now Patent No. 2,146,369, granted Feb. 7, 1939.

Where a torque converter is used in conjunction with a gear unit in which torque and speed ratios are changed mechanically by means of shifting gears, clutches or the like, it is desirable that the torque load on the gears be maintained at a minimum during such shifting. Accordingly, one of the objects of the invention is to provide a torque converter which will transmit little, if any, torque at idling speeds to facilitate shifting but which will transmit torques varying automatically from the maximum torque multiplication for which the converter is designed to substantially one to one ratio at high efficiency as the speed of the driven member is increased.

It will be understood that a slight amount of slip always occurs in the torque converter so that it never actually reaches a condition of one to one drive. Such slip, however, can be reduced to about 2% or 3% and it is intended that the term "one to one" shall be interpreted to include a condition in which some such slight slip exists between the driving and the driven elements.

The above and other objects may be accomplished by providing a torque converter including an impeller having pivoted vanes adjacent its outlet and preferably a stator having pivoted vanes adjacent its inlet. The pivoted impeller outlet vanes assume a back angle when the turbo assembly is functioning to increase torque. This back angle decreases the diameter at the vane tips of the impeller, thus in effect providing a smaller impeller. In addition the back angle decreases the circumferential component, thus reducing the torque moment necessary to turn the impeller, or permits a given torque to turn the impeller faster. These pivoted blades are governed by centrifugal weights which tend to turn them outward toward a radial angle or even a slightly forward angle. The force at the blade acting against the fluid tends to tip the blade to a back angle. These forces may be balanced to get most any desired vane angle between the limits shown, and at the desired speed, and load of impeller. At light loads and low speeds the vanes are nearly radial; at medium speeds of revolution and medium torque loads the vanes become radial. At medium speeds and heavy loads they are tipped to a back angle. At high speeds and heavy loads the vanes become radial. If desired, the impeller may also be provided with pivoted vanes adjacent its inlet end.

The pivoted stator vanes adjust themselves to produce a desirable entrance angle at the stator to meet the changing conditions and are preferably so arranged as to restrict fluid flow through the stator at low idling speeds. To this end they may be resiliently urged in one direction to tend to close the flow passage through the stator and to yield as the flow increases at increasing speeds to permit relatively free flow.

Another important feature of the invention relates to the proportioning of the flow areas and to the shaping thereof to eliminate abrupt velocity changes. Preferably the impeller has a relatively large area slightly reduced at its outlet, the rotor has a smaller area decreasing from its inlet to its outlet and the stator has an intermediate area decreasing from its inlet to its outlet.

According to one arrangement, I propose to utilize a pair of connected rotors and with this arrangement the second rotor preferably has an increasing area from its inlet to its outlet. With such proportioning of the flow areas and shaping and arranging of the vanes to avoid sharp angular changes, sudden changes in velocity of the fluid are eliminated.

A further object is to provide a unit which requires no packing box around its center shaft.

Other objects relate to a construction to eliminate or reduce friction by providing an impeller casing and a skeleton rotor having open edged vanes lying adjacent to the casing and to a novel arrangement for circulating liquid through the converter.

Other advantages and novel arrangements including desirable elements and subcombinations will appear from the following description when read in connection with the accompanying drawings, in which:

Figures 1, 2, 17:
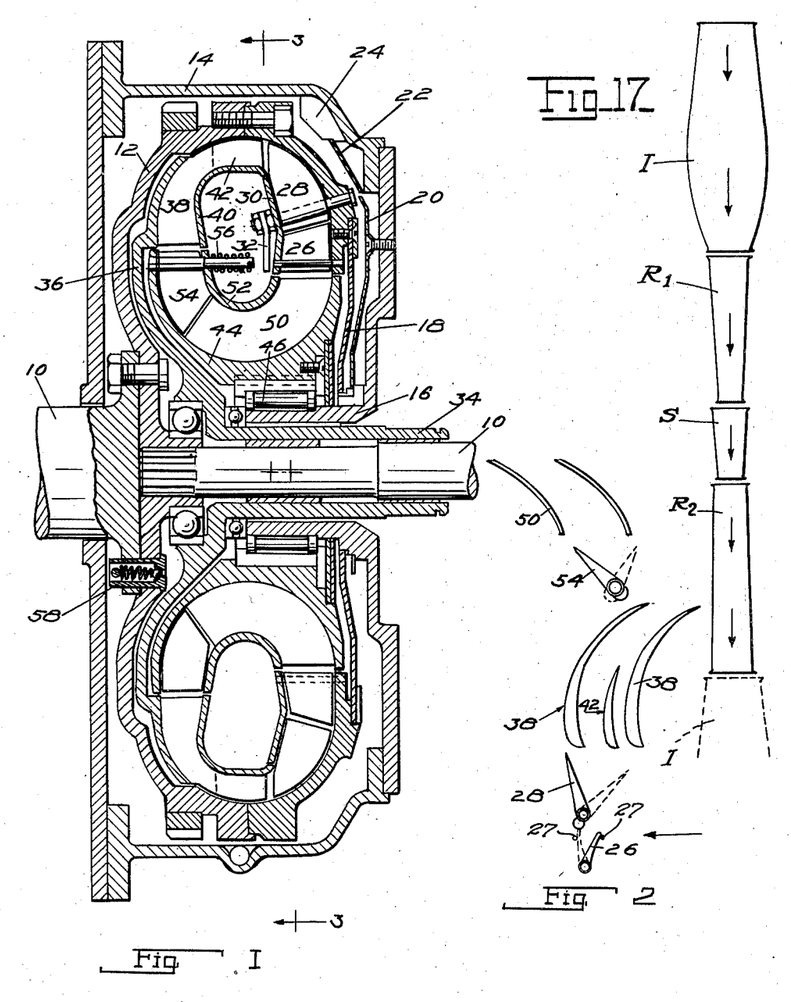
Figure 1 is an axial section of a torque converter embodying the invention.
Figure 2 is a diagrammatic view of the vanes of Figure 1.
Figure 17 is a flow diagram applicable to any of the torque converters of Figures 4, 5 or 13.
Figure 3:
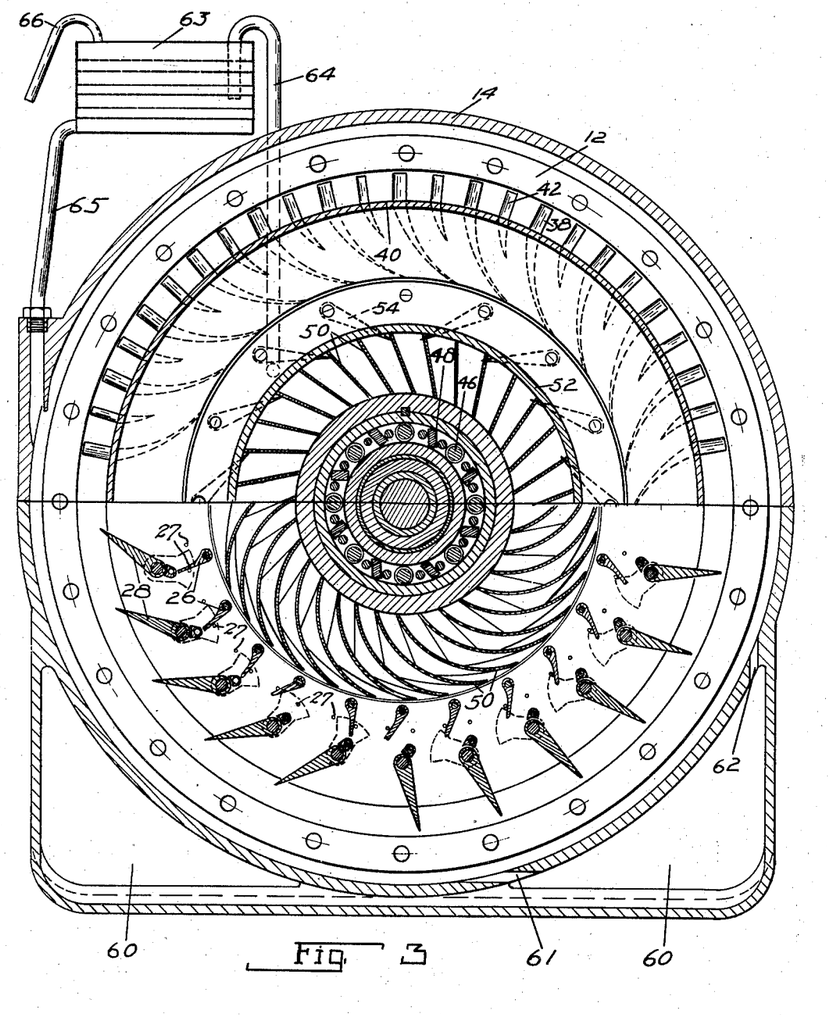
Figure 3 is a section on the line 3—3 of Figure 1.

The torque converter of Figures 1 to 3 comprises a driving shaft 10 which may be an engine crankshaft or an extension thereof and which is connected to an impeller casing 12. The casing 12 is rotatably mounted in a suitable stationary housing 14 and is sealed at its inner end against a sleeve 16 formed on or carried by the housing. The impeller casing is formed with a series of radial passages 18 opening at their inner ends into a stationary passage 20 in the casing 14 and the casing is provided at its upper portion with a funnel member 22 and a baffle 24 for directing liquid into the passages 18 and 20 as will appear more fully later.

A series of inlet vanes 26 are pivoted at their lower ends on the casing 12 and a series of outlet vanes 28 are similarly pivoted adjacent the free ends of the vanes 26. Suitable stop pins 27 carried by the impeller serve to limit pivotal movement of the vanes 26. The vane pivots carry a core member 30 overlying the inner edges of the vanes 26 and 28 and the pivots for the vanes 28 are rotatably mounted and have centrifugal weights 32 secured thereto to control the pivotal positions of vanes 28.

A rotor is mounted adjacent the impeller outlet and includes a sleeve 34 rotatably mounted on the driving shaft 10 or an extension thereof and having a flange 36 carrying a series of vanes 38. A core member 40 having its end registering with the core member 30 is secured to the inner edges of the vanes 38 and carries adjacent the inlet end of the vanes 38 a series of short vanes 42. It will be noted that the inlet ends of the vanes 38 and substantially all of the vanes 42 are unsupported at their outer edges and lie adjacent to the inner surface of the impeller casing 12. This is an important feature since it eliminates at least a portion of the area over which double casings must rotate next to each other thereby reducing friction, and since the casing 12 adds a slight frictional driving effect to liquid passing through the rotor vanes. Thus any friction occurring in at least this portion of the rotor vanes is not lost but is converted into a driving effort on the rotor.

A stator is arranged between the rotor outlet and the impeller inlet and comprises a body portion 44 mounted on the sleeve 16 on a combined one way clutch and bearing. The one way clutch and bearing may take the form of that more fully described and claimed in my co-pending application Serial No. 39,674 and may include a series of anti-friction rollers 46 and a series of locking sprags 48 to permit free rotation of the stator body 44 in one direction but to prevent rotation thereof in the opposite direction.

The stator body 44 carries a series of fixed vanes 50 to the inner edges of which a core member 52 is secured. A series of vanes 54 are pivoted adjacent the inlet end of the stator and are urged in one direction about their pivots by suitable springs 56.

One very important feature of the invention relates to proportioning the flow areas through the several elements and to shaping and arranging the vanes to provide maximum operating efficiency by eliminating frictional and turbulence losses and shock due to abrupt angular and velocity changes. It will be noted that the core members are irregularly shaped to provide irregular flow areas through the elements and by this arrangement and by varying the number and the thickness of the vanes the flow areas can be proportioned as desired.

The impeller is preferably formed with a substantially uniform flow area throughout the major portion of its length but is choked down at its outlet from about 20% to 30% by decreasing the blade width to increase the velocity of discharged liquid. Considering the average area of the impeller as 100%, the area of the rotor inlet is preferably from 30% to 50% and the rotor area decreases toward the outlet to from 20% to 30%. The stator inlet is preferably somewhat larger than the rotor outlet and the stator likewise decreases in area toward its outlet to substantially the same size as the rotor outlet. While it might ordinarily be undesirable to discharge liquid from the stator outlet into the impeller inlet at high velocity, particularly at such times as when the stator is rotating forwardly, the objections and undesirable features are largely overcome by the pivoted impeller vanes.

Figures 3A, 4:
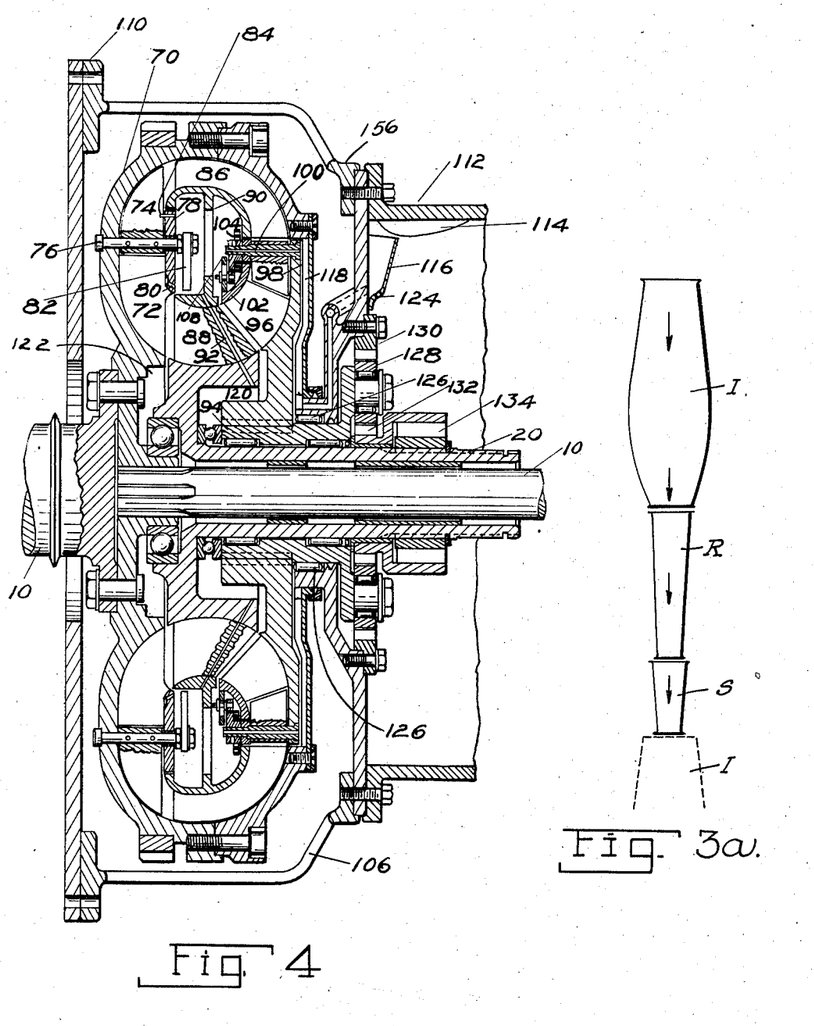
Figure 3a is a flow diagram of the torque converter of Figures 1 to 3.
Figure 4 is an axial section of a modified form of torque converter.

Figure 3a illustrates diagrammatically the variation of flow areas in the several elements. In this figure the impeller is marked I, the rotor R and the stator S. As shown, the impeller inlet has an area of about 73 square units with a maximum impeller area of 100 and an outlet area of 50. The rotor inlet has an area of 50 tapering to 30 at the outlet, and the stator inlet is shown with an area of 42 tapering to 30 at the outlet.

With the arrangement above described, the flow velocity through the impeller is low and the velocity through the rotor and stator is relatively high. Thus a high pressure is built up in the impeller which imparts energy to the rotor both through the conversion of the pressure into velocity and through the change of direction of the fluid, the stator again changing the direction of the fluid and providing a fulcrum for torque multiplication. The small vanes 42 at the rotor inlet serve both to restrict the flow area and to reduce turbulence by dividing the liquid into smaller streams.

The vanes are also so shaped as to provide a smooth flow contour as best seen in Figure 2. It will be noted that the pivoted vanes 54 are arranged so that their outlet ends will lie closely adjacent the inlet ends of the vanes 50 so that fluid can pass from one set of vanes to the other substantially without shock. The vanes 26 are preferably similarly located with respect to the vanes 28. Also if desired, the pivoted vanes may be pivoted intermediate their ends as indicated in case of the vanes 54 in Figure 2 to produce a partially balanced vane requiring less effort to turn it against the fluid reaction.

When the impeller is turning slowly the weights 32 exert very little force on the vanes 28 and fluid reaction turns them to the dotted line position of Figure 2. Liquid will therefore leave these vanes with a high radial and a low circumferential component and will pass through the rotor vanes 38 and 42. The stator vanes 54 will be held in their full line position by the springs 56 and will partially block the flow of fluid through the stator. The fluid will leave the stator with a forward circumferential component and strike the backs of the vanes 26, urging them into their dotted line position.

Under these conditions, which obtain during idling or very slow impeller speeds, very little force is transmitted to the rotor and change speed gears or clutches can be shifted readily or a vehicle or machine will stand with very little tendency to creep.

It is apparent and well known that the quantity flow of fluid is much higher through such a system when the rotor is standing or moving slowly, and the impeller is turning fast, than is the case later when the rotor turns at the same speed as the impeller. This is due to the lack of counter centrifugal head when the rotor is standing.

As the impeller speed increases the weights 32 tend to move the vanes 28 toward their full line position, but can not do so due to the large quantity fluid flow. The liquid leaving the impeller strikes the rotor vanes with a high forward component and is reversed thereby to impart a forward driving force to the rotor, the liquid leaving the rotor with a reverse component and striking the fronts of the pivoted stator vanes 54 to move them to their dotted position. The liquid leaves the stator with a forward component which under some conditions may be less than the forward rotation of the impeller, in which case it strikes the vanes 26 on the front and urges them to their full line position.

As the velocity of the rotor increases, liquid will actually leave it with a slight forward circumferential component and will strike the stator vanes on their backs, thereby turning the stator forwardly. At this time the stator is ineffective and the converter operates substantially as a two element clutch.

Liquid will be circulated through the torque converter during operation in order to maintain the converter full of liquid and to cool the liquid. For this purpose the casing 14 is preferably partially filled with liquid and as the converter rotates, it causes the liquid to swirl in the casing. The baffle 24 turns a portion of the swirling liquid into the funnel 22 which directs it into the passage 20 and the inner end of the radial passages 18. Centrifugal force causes the liquid to flow outwardly in the passages 18 and into the torque converter through the space between the stator and the impeller.

As pressure builds up in the torque converter the liquid will be forced out between the impeller, the rotor and the stator and will lubricate the several bearings. Suitable packings are preferably provided to prevent escape of liquid along the shaft 10 or sleeve 34 and a spring loaded check valve 58 is arranged in the impeller casing to permit escape of the liquid back to the housing 14.

In order to reduce the liquid drag on rotation of the impeller casing and at the same time to insure an ample supply of liquid, the casing 14 is preferably provided with tanks 60 (Figure 3) communicating with the housing 14 through a tangential inlet 61 at the bottom and a top vent 62. During rotation of the impeller casing liquid will be forced into the tanks through the tangential inlet 61 until only a relatively small amount of liquid remains in the housing 14. However, should the amount of liquid in the housing decrease, the pressure on the inlet 61 would decrease, causing liquid to back up from the tanks 60 to maintain a supply of liquid in the housing without requiring the torque converter to rotate in a large body of liquid.

Since the liquid in the torque converter is liable to become so hot as to cause vaporization under some conditions, there is preferably provided a condenser to condense any vaporized liquid and return it to the converter. As shown in Figure 3, a condenser 63 which may take the form of a conventional automobile radiator is connected by a pipe 64 with the housing 14. Any vapor generated in the housing during operation will rise through the pipe 64 into the condenser 63 where it will be condensed and returned to the housing through a pipe 65 having a tangential inlet into the housing. Preferably the condenser is provided with a vent 66 to prevent building up high pressures therein.

Figure 4 illustrates another form of hydraulic torque converter in which the shaft 10 is connected to and drives an impeller casing 70 which forms an outer liquid-tight housing for the entire unit. A series of rigid vanes 72 are secured to the impeller casing and a second series of vanes 74 are secured adjacent the upper or outlet ends of the vanes 72 on pivots 76 which are journaled in the impeller casing 70 and an annular ring 78 which is fastened to the inner edges of the vanes 72. The ring 78 has a feed opening 80 therein for the purpose of feeding liquid into the impeller vanes. The pivoted vanes 74 are controlled automatically by centrifugal weights 82 secured to the axles 76 and arranged to tilt the vanes forwardly under the influence of centrifugal force. Preferably the weights 82 are so arranged that their centers of gravity will lie substantially on a radius through the axles 76 when the vanes 74 are tilted rearwardly to reduce the effect of centrifugal force at low rotor speeds as more fully set forth in my copending application Serial No. 3,544 filed January 26, 1935. Stop pins 84 (Figure 11) are preferably provided to limit the pivotal movements of vanes 74.

A double driven rotor is arranged adjacent the impeller vanes and is carried by the sleeve 20 which is rotatable on shaft 10. As shown the rotor is constituted by a set of fixed vanes 86 mounted adjacent the impeller vanes 74 and a second set of fixed vanes 88 mounted adjacent the impeller vanes 72. The two sets of vanes 86 and 88 are rigidly connected by an annular ring 90 which has openings to permit the flow of liquid therethrough and the vanes 88 are preferably bored as at 92 to permit return flow of liquid in the event that too much is supplied to the unit and to vent air from the unit as will appear hereinafter.

Between the outlet of rotor vanes 86 and the inlet of rotor vanes 88 a stator is mounted, constituted by a sleeve 94 rotatable on the sleeve 20 and carrying a series of fixed vanes 96 and a series of vanes 98 mounted on hollow pivots 100 which are journalled in an annular plate or flange on the sleeve 94 and a ring 102 which is fastened to the inner edges of the vanes 96. A spiral spring 104 is connected to each of the pivots 100 and tends to tilt the vane 98 forwardly with respect to the direction of rotation of the impeller. Each of the pivots 100 carries at its inner end a lever 106 (Figure 10) and the levers have pins at their free ends which project through radial slots in a ring 108 to insure that all of the vanes 98 will move together.

In order to obtain high efficiencies with a hydraulic torque converter, I have found that it is extremely important to correctly proportion the areas of the flow passages through the impeller, the rotors and the stator to vary the velocity of flow through these elements. I have discovered that the best results can be obtained with a relatively low flow velocity through the impeller, a high flow velocity increasing from the inlet to the outlet through the first rotor, a high flow velocity through the stator, and a flow velocity decreasing from the inlet to the outlet in the second rotor to convert as much flow velocity into static pressure as is consistent with efficiency. I have also found that where liquid at high velocity is subjected to a rather abrupt velocity change by a set of vanes, turbulence is apt to result, thus decreasing the efficiency of the hydraulic unit.

Figures 11, 12:
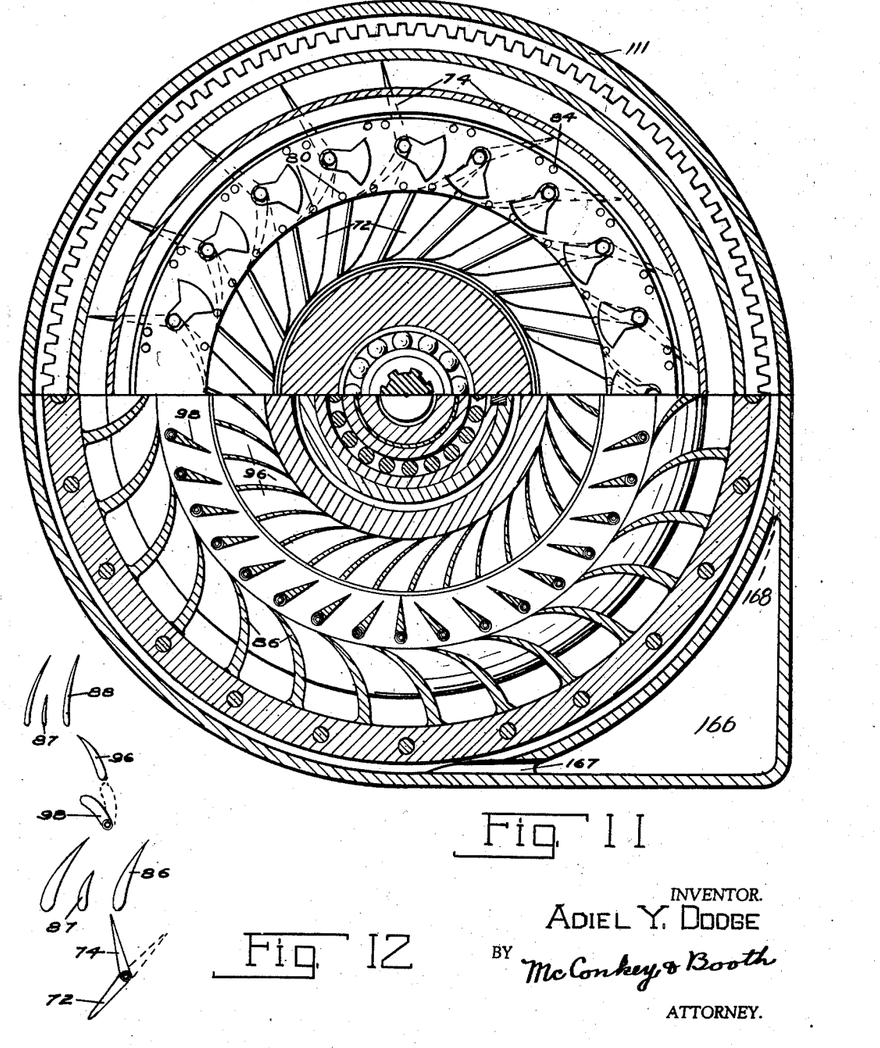
Figure 11 is a section on the line 11—11 of Figure 5.
Figure 12 is a diagrammatic view of the vanes of Figures 4 and 5.

According to the present invention and as best seen in Figure 12, these desirable results are attained and turbulence is prevented by designing the impeller with flow passages of larger area than the other elements and proportioning the areas through the other elements to obtain the desired flow relationships, it being understood that this proportioning is followed in all of the illustrated embodiments. The relationships will vary with varying conditions and requirements but in general the velocity through the first rotor should be from one and one-half to two and one-half times that through the impeller. The rotor vanes are preferably thickened adjacent their inlet ends to decrease the flow area at this point and auxiliary vanes 87 are mounted between adjacent rotor vanes at the inlet ends thereof and extending through from one third to one half of the length of the rotor vanes. The auxiliary vanes 87 serve both to restrict the flow area further in the rotors and to divide the incoming liquid into a plurality of small streams, thus reducing turbulence. It will be noted that the sharp curve of the main rotor vanes causes the flow area to decrease toward the outlet end, this effect being augmented in the case of the outer rotor by the decreasing radius of the discharge ends of the vanes.

In the arrangement of Figure 4, the torque converter is enclosed in a casing 110 having ventilation openings therein and which is connected to a gear casing 112. The gear casing is preferably adapted to contain oil or other suitable liquid for use in the hydraulic unit and such liquid is given a swirling motion in the gear casing by rotation of the gears therein or by some other suitable element driven by the driving shaft. Adjacent the top of the gear casing a baffle 114 is secured to divert the swirling oil into a feed cup 116 which communicates with a centrifugal pump 118 carried by the impeller casing 70. The pump 118 is preferably constituted by a plurality of radial passages communicating with the hollow pivots 100 so that liquid from the cup 116 will be forced through the pump 118 and pivots 100 into the center or core of the vane structure and out through feed ports 80 into the vanes.

As pressure builds up in the vanes, liquid will flow out between them through passages 120 and 122 and through the bores 92 and around the shaft bearings back to the gear casing. Thus a constant circulation of liquid is maintained when the unit is in operation to prevent the liquid from becoming overheated and at the same time to provide lubrication for the parts.

Preferably the liquid level in the gear casing is below the shaft bearings to reduce the tendency for leakage while standing and to eliminate the necessity for expensive shaft packings. The cup 116 is also preferably provided with a small leak 124 so that it will drain after the transmission has stood for a few minutes and all of the liquid will be retained in the gear casing below the shaft.

Figure 4 illustrates another desirable arrangement in which the stator is held against reverse rotation at all times but is geared to the rotor through an automatic clutch to turn forwardly at reduced speed at high rotor speed. As shown, the stator is held against reverse rotation by a combined bearing and one-way clutch 126 which acts between the sleeve 94 and a stationary part of the casing and the sleeve 94 carries a set of planet gears 128 which mesh with a fixed ring gear 130 and with a pinion formed on a sleeve 132 which is rotatable on the sleeve 20. The sleeves 20 and 132 are connected by a speed responsive clutch 134 of the type more particularly disclosed and claimed in my Patent No. 2,048,435; which is free at relatively low rotor speeds but which operates to connect the sleeves 20 and 132 when the rotor is turning relatively fast. With this arrangement when the liquid leaves the first rotor substantially radially or even with a slight forward component due to high rotor speed, the stator will be rotated forwardly to pick up the liquid and discharge it into the second rotor with a forward component. This reduces shock in the liquid which might occur if it entered the second set of rotor vanes in a radial direction and contributes to smoother operation and increased efficiency at high speeds. Also since the liquid may leave the second rotor vanes with a forward component, indicating that all of the energy has not been extracted therefrom, the rotor, under proper conditions will be driven faster than the impeller and at lower torque.

Figures 5, 6, 7, 8, 9, 10:
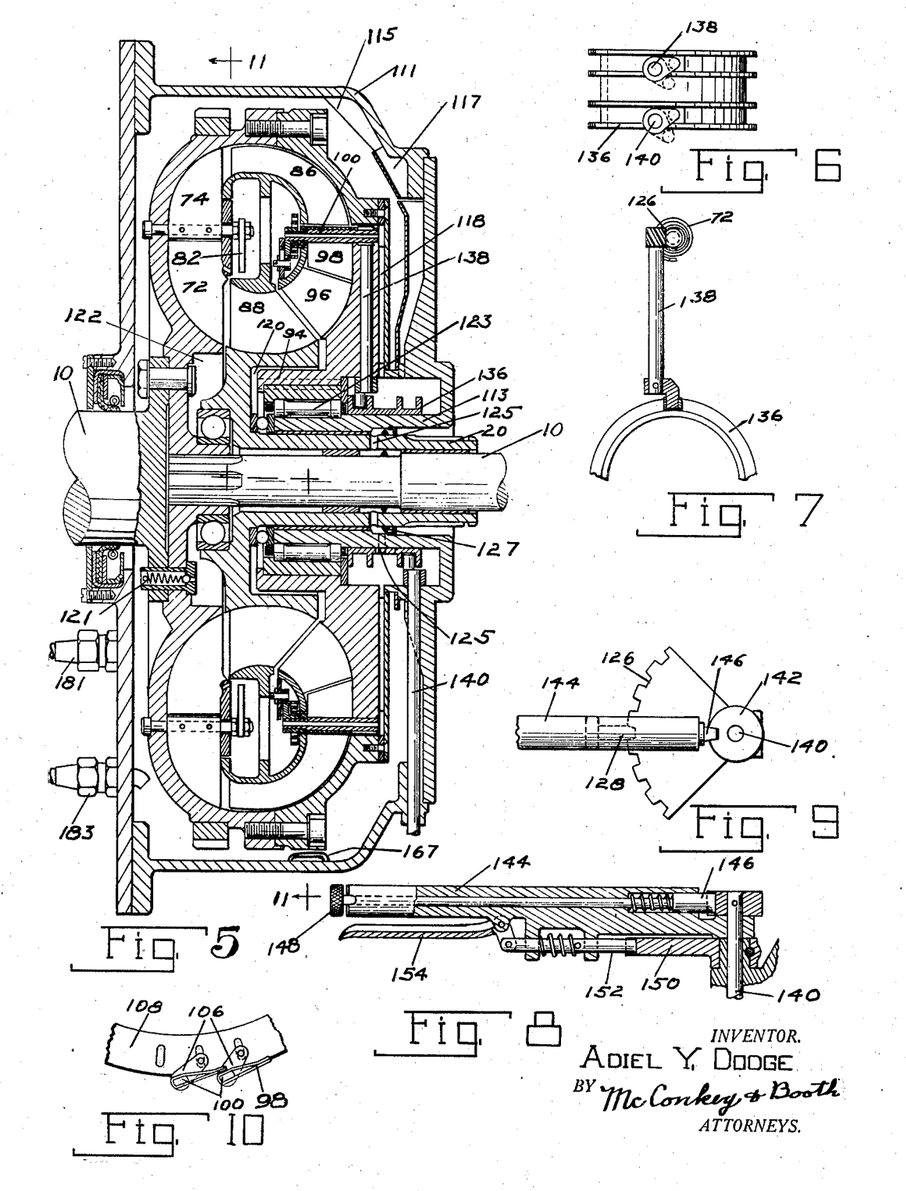
Figure 5 is an axial section of another modified form of torque converter.
Figures 6 to 10 are structural detail views of the torque converter of Figure 5.

Figure 5 illustrates a modified hydraulic torque converter, parts therein which are the same as parts in Figure 4 being indicated by the same reference numerals. In the modification of Figure 5 the hydraulic unit is enclosed in a housing 111 which is adapted to contain liquid and liquid is circulated from this housing through the hydraulic unit. As the hydraulic unit rotates it causes a swirl of liquid in the housing 111 which is deflected by a baffle 115 into a feed cup 117 from which it flows into the pump 118 and through pivot 100 into the vanes as in the construction of Figure 4. However, instead of the liquid flowing back along the shaft 12 it passes from passage 122 past a check valve 121 directly back into the casing 111. Any liquid passing through passage 120 will return directly to the inlet of the pump 118 and any liquid leaking past the bearings along the shaft 18 is drained back to the pump inlet through ports 125, leakage being prevented by oil slingers 127 on the shaft 12 and sleeve 20.

Figure 5 also serves to illustrate a manual control for the pivoted stator vanes by which the automatic control can be over-ruled and, if desired, the vanes can be turned into the position of Figure 10 to completely shut off the flow of liquid through the hydraulic unit. In this construction the stator sleeve 94 is rotatably mounted on a stationary sleeve 113 formed on the housing 111 through a combined roller bearing and one-way clutch 123. A collar 136 having a groove adjacent each of its ends is slidably mounted on the sleeve 113 and the inner groove engages one end of a crank 138 which is journalled in the sleeve 94. The other end of the crank 138 is formed as a worm and engages a worm gear formed on or secured to the pivot 100 so that rotation of the crank 138 turns the pivot 100 to adjust the stator vanes 98.

The collar 136 is moved by a crank 140 which is journalled in the casing 111 and one end of which engages the other groove in the collar 136. Thus rotation of the crank 140 slides collar 136, turns crank 138 and adjusts the vanes 98. The other end of the crank 140 projects through the casing 111 and terminates in a notched button 142 which is rigidly secured thereto. A lever 144 is freely mounted on the crank 140 and carries a spring pressed detent 146 which is adapted to engage the notch in button 142 to secure the lever to the crank. The detent 146 preferably has a rod extending through the lever 144 and terminating in a button 148 having a lug thereon adapted to fit into a notch in the end of the lever to permit the detent to move into operative position or to engage the end of the lever to hold the detent out of operation. In the last named position the cranks are free to turn to permit automatic adjustment of the vanes 98 without moving the lever 144.

In order to lock the lever and, if desired, the vanes 98 in any desired position, a segment 150 is mounted on the casing 111 and the lever 144 carries a pawl 152 engageable with the segment. When the pawl is in engagement with the segment the lever 144 cannot be moved but when the pawl is free of the segment the lever can be moved at will. Preferably the pawl is pressed into engagement with the segment by a spring and a handle 154 is provided to move the pawl.

As best seen in Figure 11 the casing 111 of Figure 5 is formed with a tank 166 communicating with the casing through a tangential inlet 167 and a vent 168. During operation liquid will be forced into the tank 166 through the tangential inlet to lower the level of liquid in which the torque converter rotates in the same manner as previously described in connection with Figures 1 to 3. The casing 111 may also, if desired, be provided with inlet and outlet connections 181 and 183 respectively for connection with a condenser such as 63 in Figure 3.

Figures 13, 14:
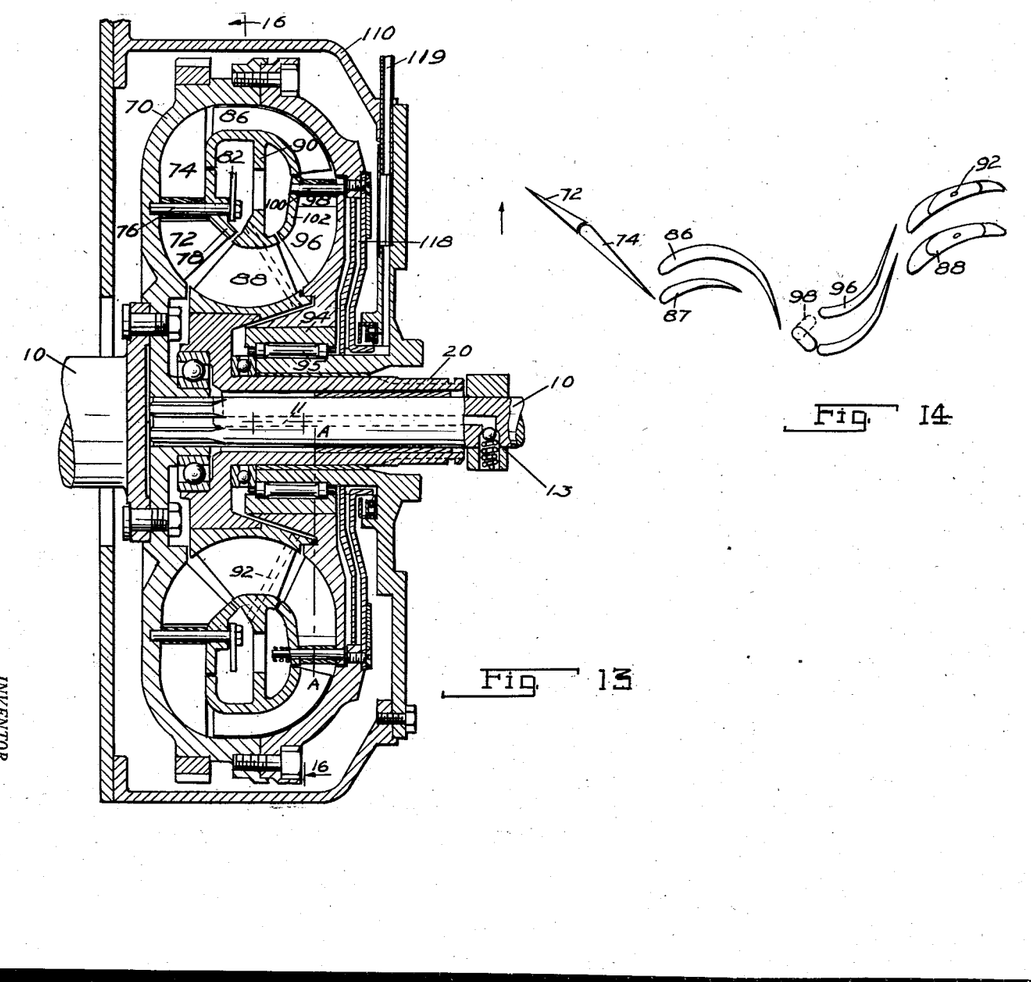
Figure 13 is an axial section of still another modified form of torque converter.
Figure 14 is a diagrammatic view of the vanes of Figure 13.
Figures 15, 16:
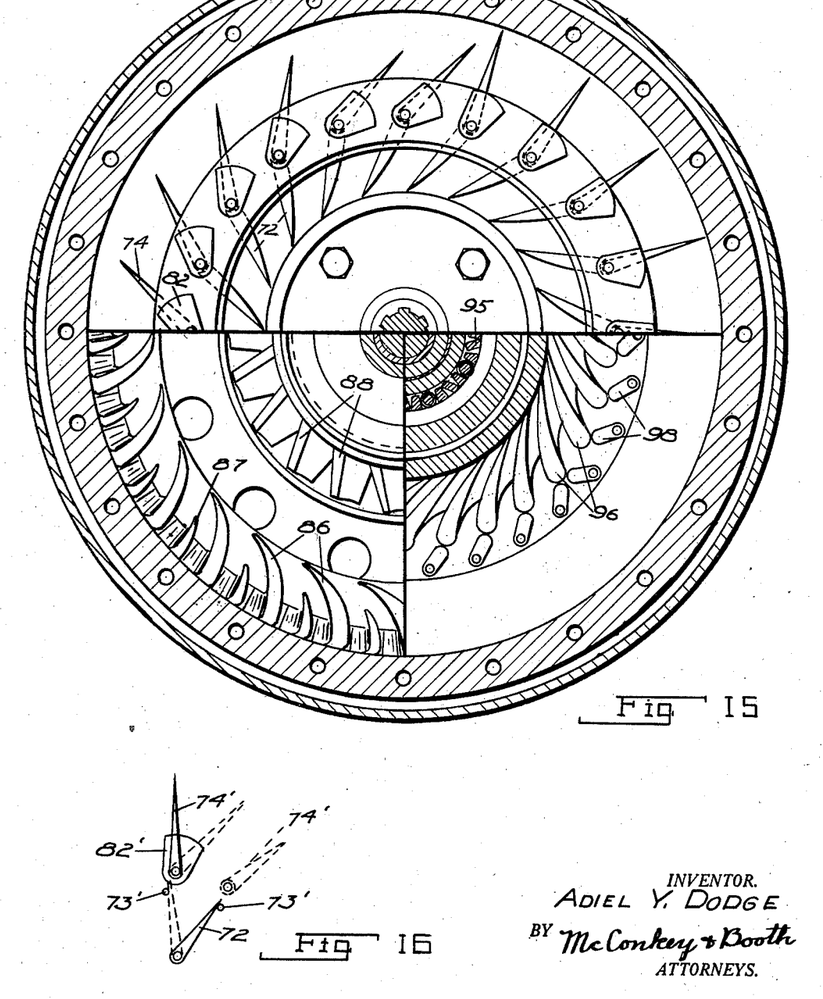
Figure 15 is a section of Figure 13 substantially on the line 16—16, the upper half showing the impeller vanes as they appear with the rotor removed, the lower left quadrant showing the rotor vanes as they appear with the stator removed and the lower right quadrant showing a section of the stator vanes on the line A—A.
Figure 16 is a diagrammatic view of a modified impeller vane construction.
Figure 18:
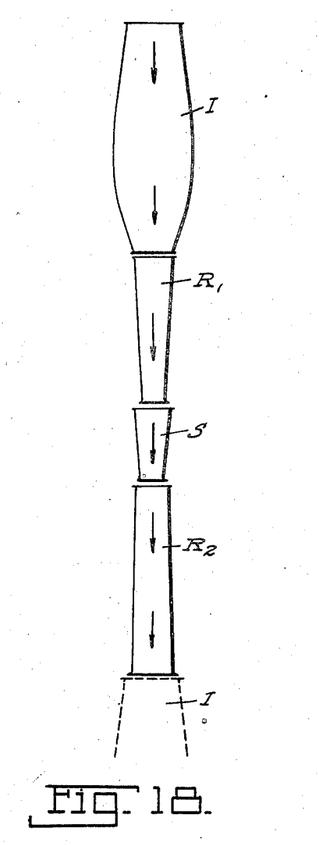

Figures 13 to 15 illustrate a further modified arrangement of a torque converter having a double rotor and for the sake of brevity of description the same reference numbers have been used in Figures 13 to 15 as in Figure 4 to designate the same parts. In Figures 13 to 15 the stator sleeve 94 is mounted on a combined one way clutch and bearing 95 which will prevent rearward rotation thereof but permit free forward rotation. Also the pivoted stator vanes 75 are relatively short and are arranged to move into alinement with either of two adjacent stator vanes 96 to provide smooth flow passages as best seen in Figure 14.

Liquid is supplied to the converter from any convenient source such as an engine driven pump through a pipe 119 which communicates with the centrifugal passage 118. From here liquid is forced into the torque converter through the hollow pivots 100 in the manner previously described. Liquid is circulated out of the torque converter between the several elements into a passage 11 formed in the drive shaft 10, a suitable spring loaded valve 13 being provided to control the outlet of liquid. Liquid passing the valve 13 may be cooled, if desired, and returned to the source to be again circulated through the pipe 119. This arrangement insures that the torque converter will be maintained full of liquid, the valve 13 being set to maintain any desired pressure therein.

It will be noted, particularly from Figure 15, that the weights 82 extend in the general direction of the pivoted vanes 74. At the left of Figure 15 the vanes and weights are shown in the position they will occupy at low speeds and at the right in the position they will occupy at high speeds. This positioning of the weights produces a different centrifugal force characteristic than the position shown in the preceding figures but the operation of the pivoted vanes 74 is, in general, substantially the same as that of the preceding figures.

The flow areas of the torque converter of Figures 13 to 15 are generally the same as in the previously described embodiments with a large area, low velocity impeller, a high velocity first rotor and stator and a relatively low velocity second rotor. Where a low velocity second rotor is employed it is generally not necessary to pivot the stator inlet vanes to avoid the undesirable features arising from a high velocity discharge into the impeller inlet. However under some circumstances it may be desirable and in this event an impeller may be arranged as indicated in Figure 16 having pivoted inlet vanes 72' and pivoted outlet vanes 74' controlled by weights 82'. Suitable stops 73' are preferably arranged to limit the movement of the vanes 72' so that the free ends of the vanes 72' will lie adjacent the pivoted ends of one or another of the vanes 74' to provide smooth flow passages.

Figure 17 is a flow diagram of a four element torque converter illustrating the relative flow areas and applies equally well to any of the torque converters of Figures 4, 5 or 13. In this figure the impeller is designated I, the first set of rotor vanes $R_1$, the stator S and the second set of rotor vanes $R_2$. The areas through the impeller, first rotor vanes and stator are substantially the same as indicated in Figure 3a and the second set of rotor vanes have an area of about 43 square units at their inlet and 63 at their outlet.

While several embodiments of the invention have been illustrated and described in detail, it will be apparent that many changes might be made therein and it is not intended to be limited to the forms shown nor otherwise than by the terms of the appended claims.

What is claimed is:

1. A hydraulic torque converter comprising an impeller, a stator and a rotor, the impeller including a plurality of vanes including outlet portions pivoted on elongated shafts, and having centrifugal weights mounted on said shafts and directly connected to the vanes to control the position of said vanes about their pivots and the stator including vanes pivoted adjacent their inlet ends.

2. A hydraulic torque converter comprising an impeller, a stator, and a rotor, the impeller including a plurality of fixed vanes adjacent the impeller inlet and a plurality of vanes pivoted adjacent the impeller outlet on elongated shafts journaled in the impeller, centrifugal weights mounted on said shafts and connected to said pivoted vanes to control their positions, and the stator including a plurality of vanes having pivoted portions adjacent their inlet ends and fixed portions adjacent their outlet ends.

3. A hydraulic torque converter comprising an impeller, a rotor having two sets of vanes adjacent the ends of said impeller, a reaction member between said sets of rotor vanes and a gear chain having a plurality of elements, one of which is fixed and two others of which are connected to said rotor and said reaction member respectively so that the reaction member may impart forward torque to the rotor or the rotor may impart forward torque to the reaction member depending upon the direction of impingement of the liquid against the reaction member.

4. A hydraulic torque converter comprising a hydraulic unit, a casing inclosing said unit, means for circulating liquid from the casing through said unit and back to the casing, and a condenser connected to the casing for receiving vaporized liquid therefrom and for returning condensate thereto.

5. A hydraulic torque converter comprising a vaned impeller, a vaned rotor and a vaned stator forming a fluid passage, said vaned impeller including fixed vanes at its inlet end and pivoted vanes adjacent the impeller outlet pivoted on elongated shafts and centrifugal weights connected to said shafts for urging said pivoted vanes in one direction, fluid reaction tending to urge the vanes in the opposite direction.

6. A hydraulic torque converter comprising a vaned impeller, a vaned rotor and a vaned stator forming a fluid passage, said impeller including a set of pivoted vanes adjacent its outlet end and a set of pivoted vanes adjacent its inlet end, the free ends of said last set of vanes lying adjacent the pivots for said first set of vanes.

7. A hydraulic torque converter comprising a vaned impeller, a vaned rotor and a vaned stator forming a fluid passage, said impeller including a set of pivoted vanes adjacent its outlet end and a set of pivoted vanes adjacent its inlet end, the free ends of said last set of vanes lying adjacent the pivots for said first set of vanes, and said stator including a set of pivoted vanes adjacent its inlet end.

8. A hydraulic torque converter comprising a vaned impeller having a series of pivoted vanes adjacent its outlet end, a vaned stator having a series of pivoted vanes adjacent its inlet end, and a rotor having two sets of vanes lying between said impeller and said stator.

9. A hydraulic torque converter comprising a vaned impeller member, a vaned rotor member and a vaned stator member forming a liquid circuit, one of said members having a series of pivoted vanes, hollow pivots on which said pivoted vanes are mounted, and means to supply liquid to said hollow pivots whereby said liquid may flow through the pivots into the torque converter.

10. A hydraulic torque converter comprising a vaned impeller, a vaned rotor and a vaned stator forming a liquid circuit, said stator having a series of pivoted vanes adjacent its inlet end, hollow pivots on which said pivoted vanes are mounted, and means to supply liquid to said hollow pivots whereby said liquid may flow through the pivots into the torque converter.

11. A hydraulic torque converter comprising a vaned impeller, a vaned rotor, and a vaned stator forming a liquid circuit, said stator having a series of pivoted vanes adjacent its inlet end, hollow pivots on which said pivoted vanes are mounted, and means forming substantially radial passages in the impeller communicating with said pivots to supply liquid to said pivots and therethrough to the torque converter.

12. A hydraulic torque converter comprising a vaned impeller, a vaned rotor and a vaned stator, said impeller having a series of fixed inlet vanes and a series of outlet vanes pivoted adjacent their inlet ends and tiltable from a position in which they form a back angle with radii passing through the pivot points into a position in which they form a forward angle with the radius.

13. A hydraulic torque converter comprising a vaned impeller, a vaned rotor and a vaned stator, said impeller having a series of fixed inlet vanes and a series of outlet vanes pivoted adjacent their inlet ends and tiltable in response to liquid pressure thereon to a position in which they form a back angle with radii passing through the pivot points and centrifugal means for tilting said vanes into a position in which they form a forward angle with the radius.

14. In a hydraulic power transmitting device comprising driving and driven elements, and a reaction element, each of said elements being provided with a series of fixed vanes which form radial passages through which the liquid flows from one element to the other in a closed circuit, the provision in the driving element, between the inlet end of the radial passages thereof and the outlet end of the radial passages of the preceding element, of an annular space within which are positioned a series of freely pivoting vanes each of which is separately mounted in the side walls of the driving element so as to lie in the path of the liquid and is acted upon by said liquid independently of the others, so that when a change of speed occurs between the driving and driven elements, the said pivotal vanes are automatically adjusted by a changing angle of impingement into such a position as will afford the most appropriate guidance for the passage of liquid from one element to the other.

15. A hydraulic power transmitting device as claimed in claim 14 in which an annular space is also provided in the reaction element, between the inlet end of the radial passages thereof and the outlet end of the radial passages of the driven element, a series of freely pivoting vanes being positioned within the said space, each vane being separately mounted in the side walls of the reaction member so as to lie in the path of the liquid and acted upon by said liquid independently of the others, so that when a change of speed occurs between the driving and driven elements, the said pivotal vanes are automatically adjusted by a changing angle of impingement into such a position as will afford the most appropriate guidance for the passage of the liquid from one element to the other.

16. A hydraulic power transmitting apparatus as claimed in claim 14 in which the reaction member is provided with a one-way clutch and is thereby capable of free movement in one direction, but remains stationary when a force is applied in the opposite direction.

17. A hydraulic power transmitting apparatus as claimed in claim 14 in which as the angle of impingement of the liquid in leaving one rotating part changes, due to alterations in the load conditions, so the liquid acts upon one side or the other of the series of pivoted vanes to automatically position them so that they afford to the moving liquid the most appropriate guidance to minimize disturbance in the liquid flow.

18. A hydraulic power transmitting apparatus as claimed in claim 14 in which the vanes are of aerofoil section.

ADIEL Y. DODGE.